US007974834B2

(12) United States Patent
Konno et al.

(10) Patent No.: US 7,974,834 B2
(45) Date of Patent: Jul. 5, 2011

(54) PROGRAM RESERVATION/PLAYBACK JUDGMENT SYSTEM, METHOD, PROGRAM AND PROGRAM RECORDING MEDIUM

(75) Inventors: Kiyotaka Konno, Tokyo (JP); Shinichiro Kamei, Tokyo (JP)

(73) Assignee: NEC Corporation, Tokyo (JP)

( * ) Notice: Subject to any disclaimer, the term of this patent is extended or adjusted under 35 U.S.C. 154(b) by 1156 days.

(21) Appl. No.: 11/713,596

(22) Filed: Mar. 5, 2007

(65) Prior Publication Data

US 2007/0226376 A1 Sep. 27, 2007

(30) Foreign Application Priority Data

Mar. 3, 2006 (JP) ................. 2006-0579054

(51) Int. Cl.
*G06F 17/27* (2006.01)
(52) U.S. Cl. ................. 704/9; 725/39; 725/41; 725/58; 725/86; 725/93; 386/200; 386/219
(58) Field of Classification Search ........ 704/9; 725/39, 725/41, 58, 86, 93, 29; 386/83, 95, 200, 386/219
See application file for complete search history.

(56) References Cited

U.S. PATENT DOCUMENTS

| 7,177,531 | B2 * | 2/2007 | Horie et al. ............ 386/126 |
| 7,219,363 | B2 * | 5/2007 | Yamato et al. .......... 725/58 |
| 7,493,646 | B2 * | 2/2009 | Ellis .................. 725/87 |
| 7,623,756 | B2 * | 11/2009 | Komori et al. .......... 386/68 |
| 7,738,767 | B2 * | 6/2010 | Kitazato ............. 386/46 |
| 7,779,445 | B2 * | 8/2010 | Ellis .................. 725/93 |
| 2002/0016960 | A1 * | 2/2002 | Yamato et al. .......... 725/1 |
| 2002/0076203 | A1 * | 6/2002 | Takahashi ............ 386/83 |
| 2003/0208758 | A1 * | 11/2003 | Schein et al. .......... 725/42 |
| 2005/0058434 | A1 * | 3/2005 | Nakashika et al. ....... 386/95 |
| 2006/0064716 | A1 * | 3/2006 | Sull et al. ............ 725/37 |
| 2007/0092204 | A1 * | 4/2007 | Wagner et al. .......... 386/83 |
| 2007/0092227 | A1 * | 4/2007 | Kikuchi et al. ......... 386/124 |

FOREIGN PATENT DOCUMENTS

| JP | 11-341371 | | 12/1999 |
| JP | 2001-8122 | | 1/2001 |
| JP | 2004336687 A | * | 11/2004 |
| JP | 2005117367 A | * | 4/2005 |
| JP | 2005-286620 | | 10/2005 |
| JP | 2005286620 A | * | 10/2005 |

OTHER PUBLICATIONS

Hiroshi, Video recording reservation information providing apparatus, video recording reservation method, program and recording medium, Oct. 13, 2005, pp. 1-29.*
Japanese Patent Office issued a Japanese Office Action dated Jan. 5, 2010, Application No. 2006-057904.

* cited by examiner

*Primary Examiner* — David R Hudspeth
*Assistant Examiner* — Lamont M Spooner
(74) *Attorney, Agent, or Firm* — Young & Thompson

(57) ABSTRACT

A program reservation/playback judgment system for making an automatic judgment of reservation or playback of a program based on the program information in texts written in a natural language. A natural language program information processing section analyzes texts read-out thereby for extracting the program information in the texts. The extracted program information is displayed as a program information screen for confirming the program information. Upon user's operation of a reservation/playback button, the program of the program information is confirmed. Based on a comparison result of the current date and time with the date and start time of the program information by a current date/time acquisition section, a date/time judgment section makes a judgment whether the program of the program information is reserved for recording or played back, thereby instructing a program monitoring device to reserve or playback.

20 Claims, 12 Drawing Sheets

FIG. 2

PROGRAM RESERVATION/PLAYBACK INSTRUCTION SCREEN

DATE: November 23, 2005
START TIME: 21:00
END TIME: 21:24
CHANNEL NUMBER: 6ch

CANCEL   RESERVATION/PLAYBACK

FIG. 7

```
INFORMATION NOT TO MISS FISHING PROGRAM
Recommended programs for this week are as follows:

<FISHING BLACK BASS>
November 24 (Friday) night: 9:00-9:24 Ch 6
Special Course for Fishing Lovers
This is weekly special programs for fishing lovers. Tonight's program provides you with
kind advices on how to make a device for fishing black bass and where to go for black
bass fishing.

<DETERMINE TROUT FISHING CHAMPION AMONG PUBLIC FIGURES!>
November 26 22:00-22:30 Ch 12
Program Name: Fishing Friends SP
This is a weekly special program for fishing friends. Ten fishing loving famous persons
get together to determine a trout fishing champion.

<LEARN LESSONS FROM A PROFESSIONAL SPEARFISH FISHERMAN>
November 28, 2005 (Monday) PM 6:00-6:54 Ch 4
Program Name: Hobby channel
This is a program to broadcast various hobbies every week. This time, the program
focuses on learning special techniques of spearfish fishing from a professional.
```

US 7,974,834 B2

PROGRAM RESERVATION/PLAYBACK JUDGMENT SYSTEM, METHOD, PROGRAM AND PROGRAM RECORDING MEDIUM

FIELD OF THE INVENTION

This application claims benefits of Japanese Patent Application No. 2006-057904 filed on Mar. 3, 2006, the contents of which are incorporated by the references.

The present invention relates generally to a program reservation/playback system and a program reservation/playback method, more specifically to a program reservation/playback judgment system, a program reservation/playback judgment method, a program therefor and a program recording medium in case of reserving, recording, playing back, and monitoring any program in a hard disc recorder, a DVD (Digital Versatile Disc) recorder, a video recorder, etc.

BACKGROUND OF THE INVENTION

In case of reserving or playing back any program in a hard disc recorder, a DVD recorder or the like, it was conventional to use different interface respectively for reserving, playing back, etc. For example, date, start time, end time and channel number are required for reserving a program. Similarly, date, start time, end time and channel number are also required for playing back a program. Regardless of the fact that date, start time, end time and channel number are included for both of reserving and playing back a program, it was necessary for the user to operate using different interface depending on reservation or playback of a program. In other words, it was impossible to use the same interface for different modes of operation.

For solving such problem and realizing a simpler operation, a program reservation and monitoring technology using an electronic program guide (EPG) is proposed recently as disclosed in a Japanese patent publication, JPA11-341371 entitled "Program Transmitting/Receiving System and Program Receiving Equipment" (referred to as a first reference below). Alternatively, a technology for reserving and monitoring a program based on a program data that is distributed as supplemental data of a digital broadcasting as disclosed in a Japanese patent publication, JPA2001-8122 entitled "Receiver for Digital Broadcasting" (referred to as a second reference below).

However, the technologies as disclosed in the above first and second references need to identify a target program that the user likes to reserve or monitor in a predetermined format based on the EPG or the program data. This means that the user needs to follow a predetermined different procedure for the EPG or the program data in order to identify the program. This requires a troublesome operation procedure and may make errors in reserving or monitoring procedure if not accustomed. On the other hand, when identifying the date and time of any program, all of year, month, day and time must be inputted correctly without any failure, thereby making the inputting operation very troublesome and failing to reserve or monitor the desired program in a certain case.

SUMMARY OF THE INVENTION

It is therefore an object of the present invention to provide a program reservation/playback judgment system, a program reservation/playback judgment method, a program therefor and a recording medium for the program in which a program can be reserved or played back using the same interface, a natural language can be used for identifying the date and time and also the date and time excluding year may be used in certain cases.

In order to solve the above problem and achieve the above objective, the program reservation/playback judgment system, the program reservation/playback judgment method, the program therefor and a memory device for the program according to the present invention employ the following unique constructions:

(1) A program reservation/playback judgment system including natural language program information processing means for reading texts written in a natural language and including program information comprising at least date, start time, end time and channel number of any program that the user likes to reserve for recording or playback, for extracting the program information included in the texts and for reserving for recording or playing back the program based on the extracted program information, comprising: current date/time acquisition means for acquiring the current date and time; and date/time judgment means for making a judgment whether the program of the program information is reserved for recording or played back based on the current date and time acquired by the current date/time acquisition means and the program information.

(2) A program reservation/playback system of the above (1), wherein the program information extracted from the texts is displayed on a display device as a confirmation screen for enabling the user to operate a confirmation button before the date/time judgment means makes a judgment operation whether the program of the program information is reserved for recording or played back.

(3) A program reservation/playback judgment system of the above (2), wherein the program information extracted from the texts is displayed on the display device as a confirmation screen for enabling the user to edit the displayed contents of the program information on the confirmation screen.

(4) A program reservation/playback judgment system of either one of the above (1)-(3), wherein the date/time judgment means compares the date and start time of the program information with the current date and time for instructing reservation for recording the program of the program information if the date and start time of the program information are future date and time relative to the current date and time, while instructing playback of the program of the program information if the date and start time of the program of the program information are past date and time relative to the current date and time.

(5) A program reservation/playback judgment system of the above (4), wherein the date/time judgment means instructs monitoring of the program of the program information if the date and time of the program information are past date and time relative to the current date and time and also the end time of the program information is future time relative to the current time.

(6) A program reservation/playback judgment system of either one of the above (1)-(5), further comprising year complementing means for complementing year information of the date of the program information with reference to the current date and time acquired by the date/time acquisition means if the date of the program information extracted from the texts excludes year information and includes only month and day.

(7) A program reservation/playback judgment system of either one of the above (2)-(6), wherein a program information input screen for inputting the program information of any program that the user likes to reserve for recording or playback and comprising at least date, start time, end time and channel number is use as the confirmation screen for displaying on the screen of the display device the program information extracted from the texts.

(8) A program reservation/playback judgment system of either one of the above (1)-(7), wherein the texts are either text files of Web pages, electronic mails or electronic libraries, or OCR read-out of newspaper or magazine articles, or alternatively program related texts prepared by the user.

(9) A program reservation/playback judgment method having a natural language program information processing step for reading texts written in a natural language and including program information comprising at least date, start time, end time and channel number of any program that the user likes to reserve for recording or playback, analyzing the texts and extracting the program information contained in the texts for reserving or playing back the program based on the extracted program information, comprising: a current date/time acquisition step for acquiring the current date and time; and a date/time judgment step for making a reservation or playback judgment whether the program of the program information is reserved for recording or played back based on the current date and time acquired in the current date/time acquisition step and the program information.

(10) A program reservation/playback judgment method of the above (9), wherein the program information extracted from the texts are displayed on the screen of a display device as a confirmation screen, and the reservation or playback judgment operation for making a judgment whether the program of the program information is reserved for recording or played back in the date/time judgment step is performed upon users confirmation by pushing an operation button.

(11) A program reservation/playback judgment method of the above (10), wherein the program information extracted from the texts are displayed on the display device as the confirmation screen for enabling the user to edit the contents of the displayed program information on the confirmation screen.

(12) A program reservation/playback judgment method of either one of the above (9)-(11), wherein the date/time judgment step compares the date and start time of the program information with the current date and time for instructing reservation for recording the program of the program information if the date and start time of the program information are future date and time relative to the current date and time, while instructing playback the program of the program information if the date and time of the program information are past date and time relative to the current date and time.

(13) A program reservation/playback judgment method of the above (12), wherein the date/time judgment step instructs monitoring the program of the program information if the date and start time of the program information are past date and time relative to the current date and time and also the end time of the program information is future time relative to the current date and time.

(14) A program reservation/playback judgment method of either one of the above (9)-(13), further comprising a year complementing step for complementing year information of the date of the program information with reference to the current date and time acquired in the current date/time acquisition step if the date of the program information extracted from the texts includes only month and day and excludes year information.

(15) A program reservation/playback judgment method of either one of the above (10)-(14), wherein a program information input screen for enabling the user to input the program information comprising at least date, start time, end time and channel number of any program that the user likes to reserve for recording or playback is used as the confirmation screen instead of displaying the program information extracted from the texts on a display device.

(16) A program reservation/playback judgment method of either one of the above (9)-(15), wherein the texts are text files of Web pages, electronic mails, electronic libraries or OCR read-out of articles in magazines or newspapers, or program related texts prepared by the user.

(17) A program reservation/playback judgment program for the program reservation/playback judgment method of either one of the above (9)-(16) in a computer executable form.

(18) A program recording medium for recording the program reservation/playback judgment program of the above (17) in a computer readable recording medium.

The program reservation/playback judgment system, the program reservation/playback method, the program for such method and the memory medium for the program according to the present invention exhibit the following advantages:

Firstly, the program reservation/playback judgment system, the program reservation/playback judgment method, the program recording medium for the program reservation/playback judgment method and the program recording medium according to the present invention enable to extract the program information contained in texts written in a natural language for reserving, playing back or monitoring the program of the extracted program information.

Secondly, the user is able to confirm the program information displayed as the confirmation screen and operate a single button for instruction upon confirming correctness of the program information without distinguishing reservation, playback or monitoring, thereby properly making judgment of reservation, playback or monitoring based on a comparison result of the date and time of the program information and the current date and time. As a result, the user is able to operate with the same interface regardless of reservation, playback or monitoring.

Thirdly, even if the date of the program information includes only month and day, year information can be complemented from the current date for making proper judgment of reservation, playback or monitoring based on a result of judgment of the date and time of the year complemented date of the program information.

Fourthly, even if there is any error in the program information that is displayed on the screen as the confirmation screen, the user is able to edit contents on the displayed confirmation screen to correct such error, thereby enabling the user to instruct by operating a single button after confirmation of the edited confirmation screen for reserving, playing back or monitoring the program based on the edited program information.

Finally, it is also possible to use the editable confirmation screen as an input screen for inputting the program information of the program to be reserved, played back or monitored. In this case, the user does not need to distinguish reservation, playback or monitoring but only needs to operate a single button so that reservation, playback or monitoring processing can be made properly, thereby enabling the user to use the same interface regardless of reservation, playback or monitoring of the program.

BRIEF DESCRIPTION OF THE DRAWINGS

In the accompanying drawings,

FIG. 2 is an exemplified screen configuration of a program reservation/playback instruction screen for confirming the program information instructed by a natural language;

FIG. 7 is an example of describing a program information that introduces the program by text sentences in a natural language;

DETAILED DESCRIPTION OF PREFERRED EMBODIMENTS

Now, preferred embodiments of the program reservation/playback judgment system, the program reservation/playback judgment method, the program for the program reservation/playback judgment method and the program recording medium according to the present invention will described hereinafter with reference to the accompanying drawings.

A description will be first made on a first embodiment of the present invention in which date and time to be used for reserving, playing back or monitoring a program is inputted using the same interface of a natural language regardless of reservation, playback or monitoring. Then, a description will be made on a second embodiment in which a system capable of reserving, playing back or monitoring a program is configured using program information input screen of the same interface.

First Embodiment

Figure 1:
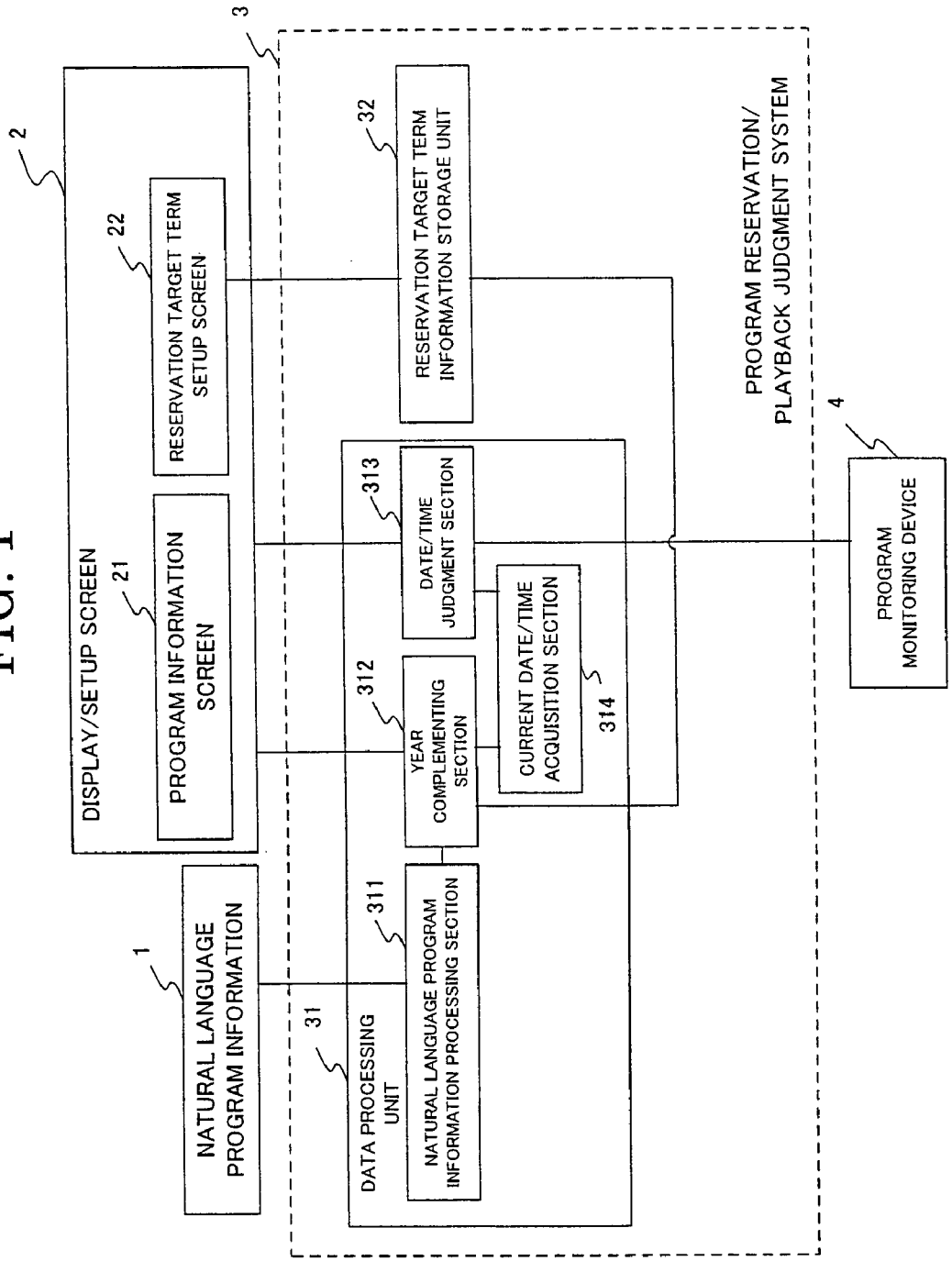
FIG. 1 is a block diagram to illustrate an exemplified system for reserving and playing back a program using a natural language as a first embodiment of the present invention.

Now, the first embodiment of the present invention will be described. FIG. 1 is a block diagram to illustrate an exemplified system for reserving or playing back a program using a natural language as the first embodiment of the present invention in which the same interface can be used for reserving, playing back and monitoring a program. FIG. 2 is a screen configuration to illustrate an exemplified program reservation/playback instruction screen for confirming the program information that is instructed in a natural language. That is, FIG. 2 is an exemplified screen format of a display screen for confirming a result of analysis of the program information in a natural language.

On the other hand, FIG. 7 is exemplified program information that introduces a program by text sentences in a natural language, i.e., program information for a fishing program. As shown in FIG. 7, information for the date, start time, end time and channel number that is necessary for reserving or playing-back a program is included in the texts. In the program reservation/playback judgment system 3 as shown in FIG. 1, the text sentences described in a natural language as shown in FIG. 7 are analyzed to extract from the text sentences the information relating to the date, start time, end time and channel number that are necessary for reserving or playing back the program. And the extracted information is displayed on a confirmation screen such as the program reservation/playback instruction screen in FIG. 2. When the program information relating to the program that the user desires to reserve or playback, it is possible to automatically reserve, playback, or monitor the program by referencing the date, start time, end time and channel number of the program to the current date and time upon pushing down a single "reservation/playback" button regardless of reservation or playback of the program.

Now, the system configuration in FIG. 1 will be described hereunder. The system in FIG. 1 comprises at least natural language program information 1, a display/setup screen 2, a program reservation/playback judgment system 3 and a program monitoring equipment 4. The program monitoring equipment 4 has not only a television receiving function but also a recording/playback function such as a hard disc recorder, a DVD recorder or the like, thereby enabling the user to reserve, playback or monitor the program that is designated by the date, start time, end time and channel number.

The natural language program information 1 is, for example, text information including program information written in a natural language such as fishing program in FIG. 7. They may be text files relating to program information as included in Web pages, electronic mails, electronic libraries or the like, or text files of articles introducing programs as carried in magazines, newspapers or the like which are read by an OCR (Optical Character Reader), etc. Of course, they may be text files relating to programs prepared by the user.

The display/setup screen 2 is a screen for displaying on a display device either one or both of a program information screen 21 and a reservation target term setup screen 22. The program information screen 21 is a display screen including at least date, start time, end time and channel number of a program such as the program reservation/playback instruction screen in FIG. 2 for the purpose of choosing any program to be reserved or played back or for confirmation. A "cancel" button and a "reservation/playback" button are also displayed on the program information screen 21. It is to be noted that the user is able to edit the date, start time, end time or channel number of the program displayed on the respective display frame.

Figure 3:
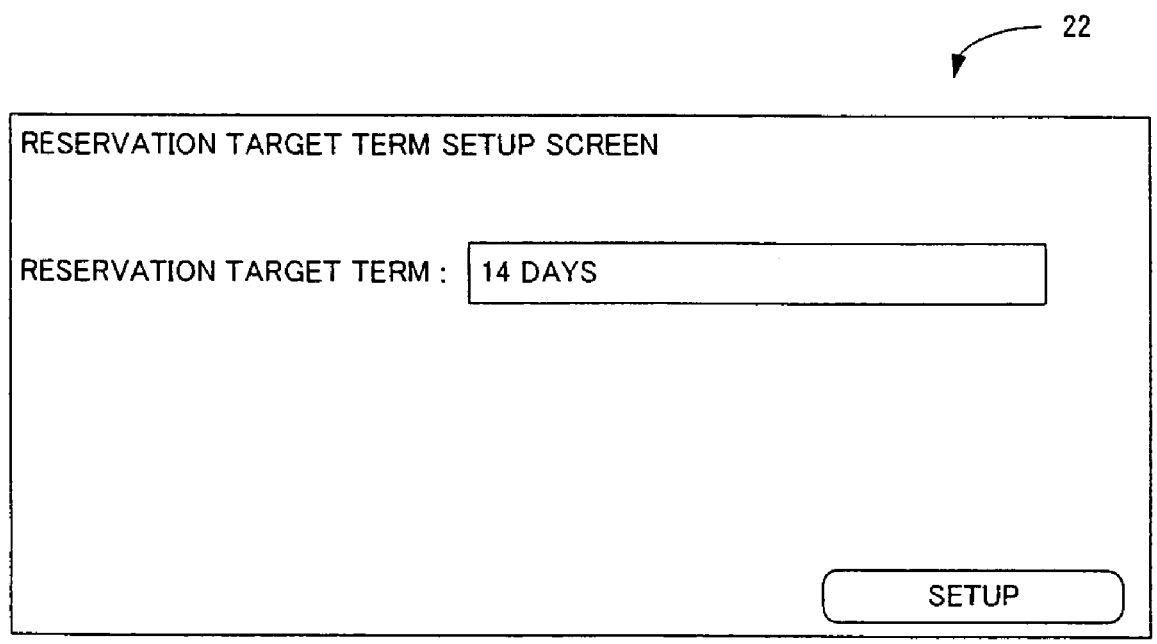
FIG. 3 is an exemplified screen configuration of a reservation target term setup screen for setting-up the reservation target term.

On the other hand, the reservation target term setup screen 22 in the display/setup screen 2 is a screen having an input frame for enabling the user to setup the reservation target term as exemplified in FIG. 3. This is a screen displayed for the user to register the term to be reserved. When the user pushes down a "setup" button after inputting the term in the input frame for the reservation target term (14 days in the particular example in FIG. 3), registration of the reservation target term will be completed. It is to be noted that FIG. 3 is an exemplified screen configuration of the reservation target term setup screen for setting-up and registering the reservation target term.

The program reservation/playback judgment system 3 comprises at least a data processing unit 31 that is designed to operate in accordance with a program and a reservation target term information storage unit 32. The data processing unit 31 comprises at least a natural language program information processing section 311, a year complimenting section 312, a date and time judgment section 313 and a current date/time acquisition section 314. The reservation target time information storage unit 32 is a memory for saving information relating to the reservation target term that is inputted based on the reservation target term setup screen 22 and is designed to be accessible from the data processing unit 31.

The natural language program information processing section 311 reads and analyzes texts written in a natural language in the natural language program information 1 for extracting program information relating to the date, start time, end time and channel number of any program to be used for reserving, playing back or monitoring a program. If no year information is included in the extracted program information, the year complimenting section 312 adds year information to the date and displays it on the program information screen for obtaining user's confirmation.

If no year information is included in the date of the program information that is received from the natural language program information processing section 311, the year complementing section 312 complements year information in the date of the program information using the current date and time that are acquired from the current date/time acquisition section 314 and the reservation target term information that is saved in the reservation target term information storage unit 32. Then, program information including the complemented date including year, month and day is outputted, thereby displaying such program information with the date including year information when displaying on the screen as the program information screen 21.

As a result, the program information display 21 such as the program reservation/playback instruction screen in FIG. 2 will be displayed as the display/setup screen 2. When the user pushes down the reservation/playback button, instructions for reservation, playback or monitoring of the program displayed on the screen are confirmed. A judgment is made on the program whether it is reserved, played back or monitored by the date and time judgment section 313. Then, the date, start time, end time and channel number of the program represented by the program information is sent to the program monitoring device 4 so that the corresponding reservation, playback or monitoring processing will be carried out thereby. On the other hand, when the cancel button is pushed down, the program information will be canceled and processing to sequentially extract and display program information for the next programs will be carried out until program information extracted from the natural language texts will be depleted. It is to be noted that the program information screen 21 such as the program reservation/playback instruction screen may be edited on the displayed program information for correcting any error in the program information written in a natural language that is displayed on the screen.

The date and time judgment section 313 acquires the current date and time from the current date/time acquisition section 314 to carry out processing for making judgment whether the program is to be reserved, played back or monitored by comparing the acquired current date and time with the date, start time, end time and channel number of the program information for the program that is confirmed to be reserved, played back or monitored. Then, the program monitoring device 4 is instructed based on the result of judgment.

Figure 4:
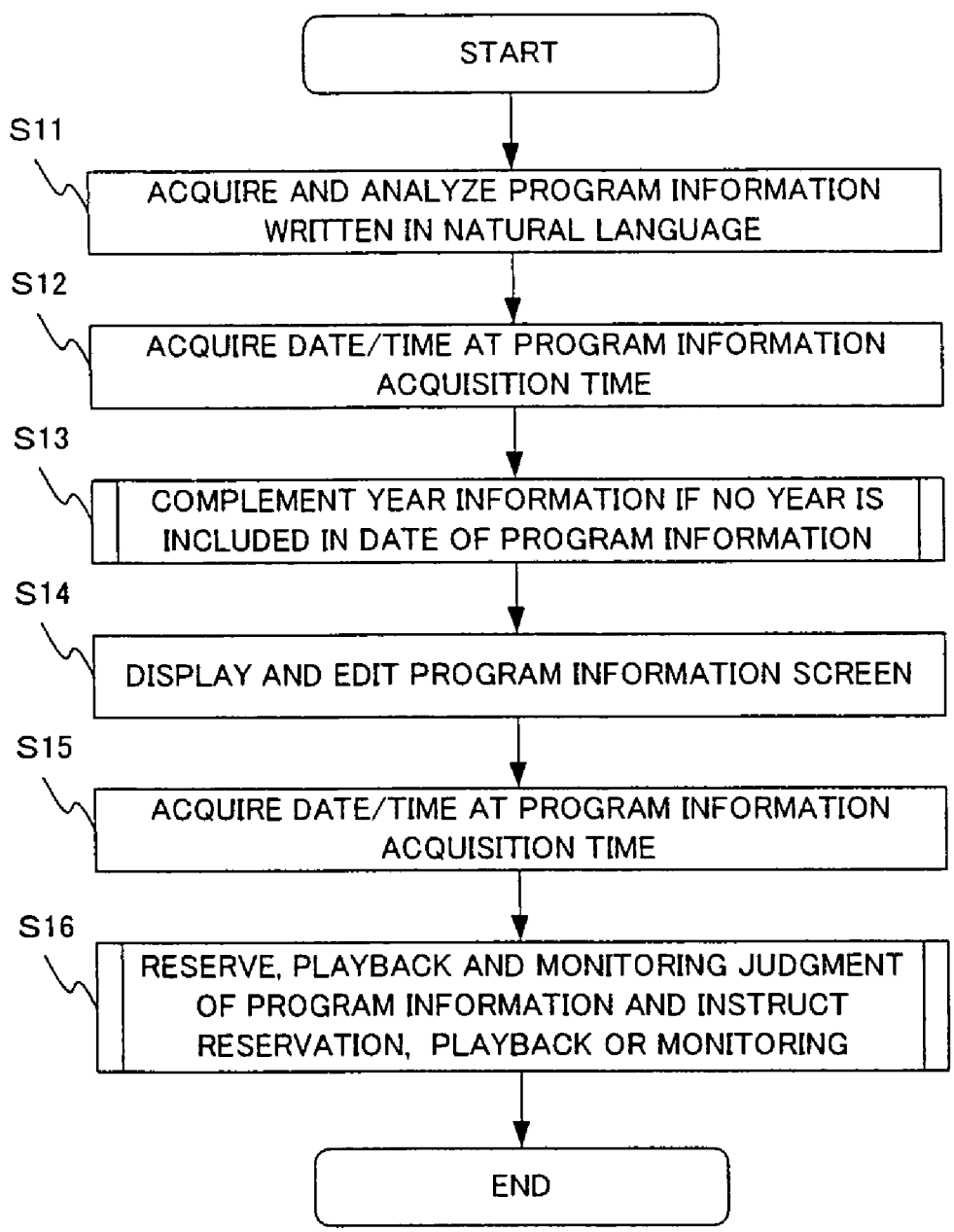
FIG. 4 is a flowchart for describing an exemplified operation in the first embodiment of the present invention.
Figure 5:
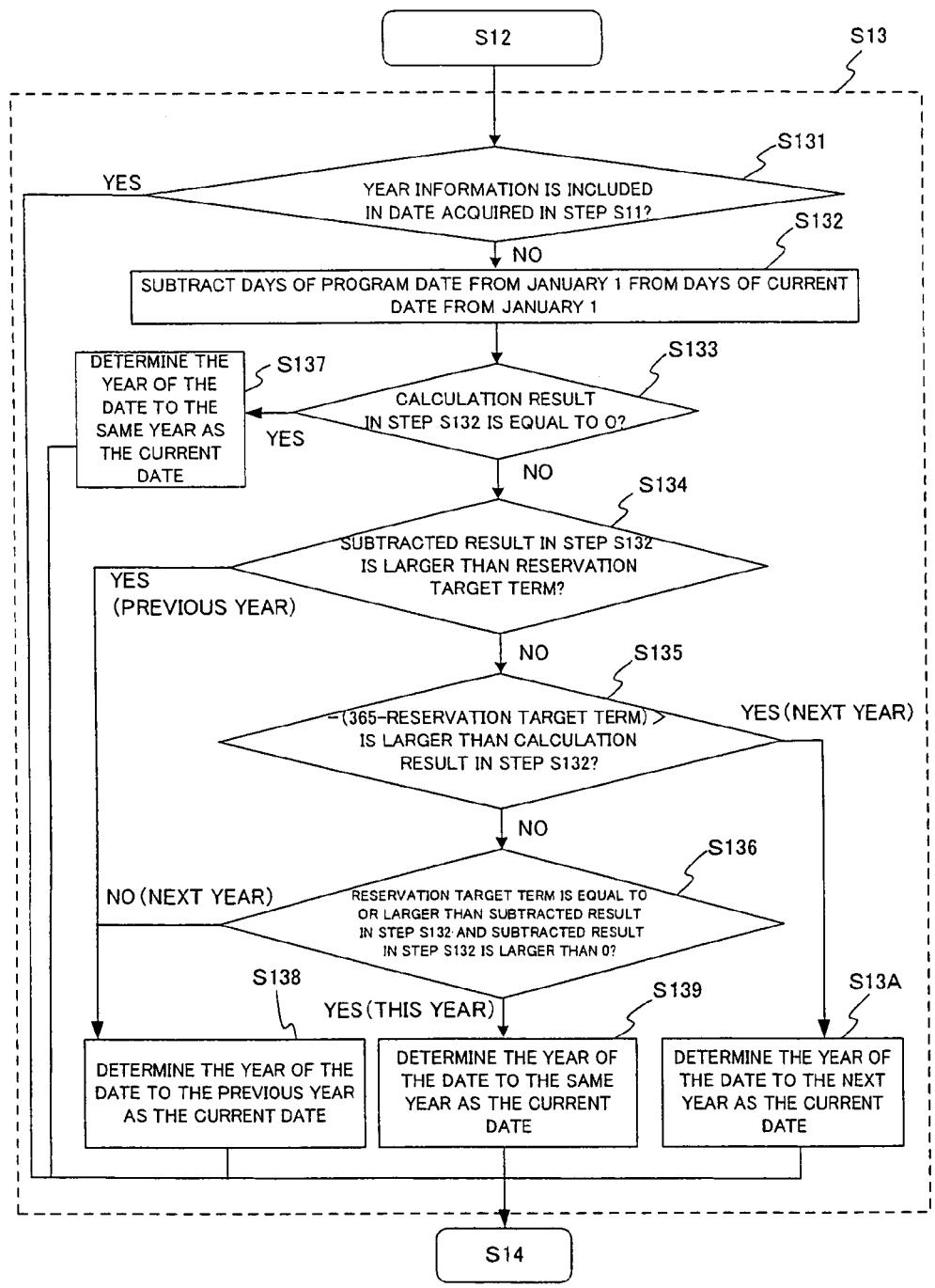
FIG. 5 is a flowchart for detailed description of step S13 in FIG. 4.
Figure 6:
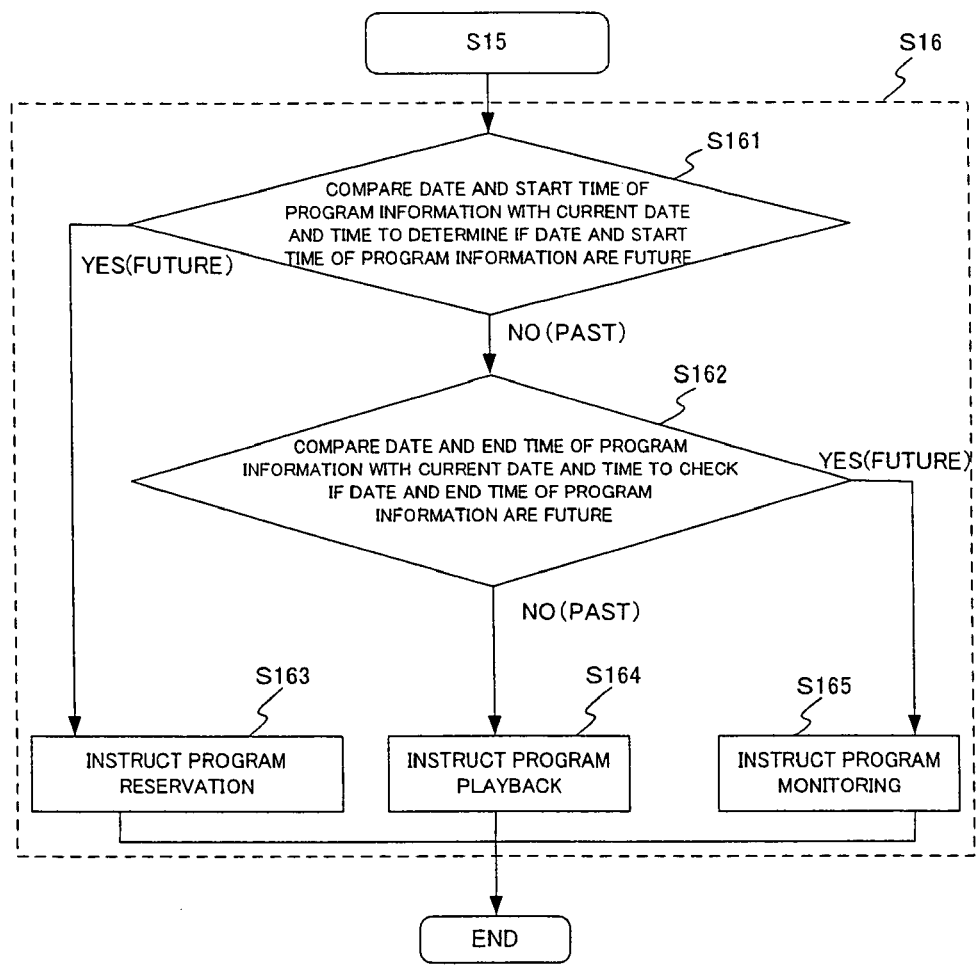
FIG. 6 is a flowchart for detailed description of step S16 in FIG. 4.

Now, the overall operation of the first embodiment of the present invention will be described with reference to flowcharts in FIGS. 4, 5 and 6 together with the block diagram in FIG. 1 and the display screens in FIGS. 2 and 3. FIG. 4 is a flowchart for describing an exemplified operation of the first embodiment of the present invention. FIG. 5 is a flowchart for describing in detail the operation in step S13 in FIG. 4. FIG. 6 is a flowchart for describing in detail the operation in step S16 in FIG. 4.

Firstly, referring to the flowchart in FIG. 4, the data processing unit 31 reads the natural language program information 1 and activates the natural language program information processing section 311. The natural language program information processing section 311 analyzes the texts written in a natural language that are inputted as the natural language program information 1 and extracts and acquires information relating to the date, start time, end time and channel number of the program to be used for reservation or playback of the program as the program information (step S11). It is to be noted that the natural language program information 1 is text information including program information written in a natural language such as, for example, information on the fishing program in FIG. 7 as described hereinabove. The natural language program information 1 may be text files relating to programs that are included in Web pages, electronic mails or electronic library, text files of articles introducing programs in magazines, newspapers and the like that are read by an OCR (Optical Character Reader), etc.

Now, the natural language program information processing section 311 sends to the year complementing section 312 the information on the date included in the program information so as to complement the year information if no year information is included in the date that is included in the acquired program information. The year complementing section 312 acquires from the current date/time acquisition section 314 the date and time at the time when the program information is acquired (step S12). The year complementing section 312 checks the date in the program information that is sent from the natural language program information processing section 311. If no year information is included, it complements the year information to the date in the program information for providing a complete date including year, month and day (step S13). The detailed operation of step S13 that complements year information of the date in the program information by the year complementing section 312 will be described hereinafter with reference to FIG. 5.

In FIG. 5, the year complementing section 312 first checks if the date in the program information that is sent from the natural language program information processing section 311 includes year information (step S131). Since there is no need to complements year information if year is included in the date of the program information (i.e., step S131: YES), the year complementing section 312 ends its processing and moves to step S14 in FIG. 4.

On the other hand, if no year information is included in the date of the program information (i.e., step S131: NO), then the date of the program information and the current date acquired from the current date/time acquisition section 314 are compared using days respectively calculated from January 1 by subtracting days of the current date from January 1 from the days in the date of the program information from January 1 (step S132). Then, check is made whether the result of subtraction is 0 or not (step S133). If the result of subtraction is 0 (i.e., step S133: YES), it is determined that the year in the date of the program information whose year information was not set is equal to the year in the date of the current date that is acquired from the current date/time acquisition section 314 and the current year is complemented to the date of the program information (step S137).

On the other hand, if the subtracted result in step S132 is not 0 (i.e., step S133: NO), a check is made if the subtracted result is larger than the days of the reserved target term that is saved in the reservation target term information storage unit 32 (step S134). Assuming the case that the program information has been given, the reservation target term is the days of the reservation target that the user has been set in advance by means of the reservation target term setup screen 22 as exemplified in FIGS. 1 and 3, for example, two weeks (14 days).

The reservation target term may be set, for example, based on the days included in program information that is delivered to the user and may be revised to increase or decrease to any desired days.

If the subtracted result in step S132 is larger than the days in the reservation target term (i.e., step S134: YES), the year supplementing section 312 makes a judgment to be the program information relating to a program that was recorded in the past. As a result, the date of the program information excluding the year information is confirmed to be the date in the previous year of the date in the current date that is acquired from the current date/time acquisition section 314 and complements the year of the date of the program information to the next previous year (step S138).

On the contrary, if the subtracted result in step S132 is not larger than the days of the reservation target term (i.e., step S134: NO), the year complementing section 312 checks if the subtracted result in step S132 smaller than "−(365−reservation target term)" days (step S135). If the subtracted result in step S132 is smaller than "−(365−reservation target term)" days (i.e., step S135: YES), the year complementing section 312 makes a judgment for program reservation in the next year. Accordingly, the date of the program information having no year information is confirmed to be directed to reserve a program in the next year of the current date that is acquired from the current date/time acquisition section 314 and the year complementing section 312 complements the date of the program information to the next year (step S13A).

If the subtracted result in step S132 is not smaller than the "−(365−reservation target term)" days (i.e., step S135: NO), the year complementing section 312 further checks if the subtracted result in step S132 is smaller than the days in the reservation target term and also if it is larger than 0 (step S136). If the subtracted result in step S132 is smaller than the days in the reservation target term and also larger than 0 (i.e., step S136: YES), the year complementing section 312 confirms that the date of the program information having no year information is the date in the year of the current date that is acquired from the current date/time acquisition section 314, thereby complementing the date of the program information to the current year (step S139).

If the subtracted result in step S132 is smaller than the days of the reservation target term but larger than 0 (i.e., step S136: NO), the year complementing section 312 makes a judgment to be the program information for program that was recorded in the past. As a result, the date of the program information having no year information is confirmed to be the next previous year of the current date acquired from the current date/time acquisition section 314 and complements the date of the program information to the next previous year (step S138).

It is to be noted that the year complementing processing of the year complementing section 312 in case of no year information is included but week information is included in the date of program information may be made by checking with a calendar.

When the year complementing section 312 completes the year information complementing process for complementing year information in the date of program information as described hereinabove, the process returns to step S14 in FIG. 4. The data processing unit 31 displays on the display device program information containing the date having the year information that is complemented by the year complementing section 312, start time, end time and channel number as the program information screen (confirmation screen) 21 such as the program reservation/playback instruction screen as shown in FIG. 2 (step S14). If the user confirms that the date, start time, end time and channel number displayed on the display device as the program information screen 21 have no error, reservation, playback or monitoring of the program identified by the program information is confirmed upon user's push-down of the "reservation/playback" button in FIG. 2 and the process moves to the next step S15. On the other hand, if the user detects any error in the date, start time, end time or channel number that are displayed on the program information screen 21, the error portion is corrected by the user before pushing down the "reservation/playback" button.

On the other hand, if the user likes to cancel reservation, playback or monitoring of the program designated by the date, start time, end time and channel number displayed on the display screen as the program information screen 21, the user pushes down the "cancel" button in FIG. 2. Then, the reservation, playback or monitoring of the displayed program information is cancelled and the next program information that is contained in the texts written in a natural language can be displayed on the display screen.

If reservation, playback or monitoring of any program represented by the program information is confirmed, the date and time judgment section 313 is activated in order to make a judgment whether reservation, playback or monitoring is carried out. The date and time judgment section 313 performs judgment processing to determine whether the program represented by the program information is reserved, played back or monitored by acquiring the date and time at the acquisition time of the program information from the current date/time acquisition section 314 (step S15). Then, reservation, playback or monitoring processing of the program is instructed based on the result of the judgment processing (step S16). The detailed operation of the date and time judgment section 313 in step S16 for judging and instructing reservation, playback or monitoring of the program will be described hereinafter with reference to FIG. 6.

In FIG. 6, the date and time judgment section 313 first compares the date and start time of the program information with the current date and current time as acquired from the current date/time acquisition section 314 (step S161). If the comparison result proves that the date and time of the program information are future date and time as compared to the current date and time (i.e., step S161: YES), since the program of the program information is a future program that is not broadcasted yet, the date and time judgment section 313 sends the date, start time, end time and channel number of the program information to the program monitoring device 4 as reserved recording information and instructs reserved recording of the program (step S163).

On the other hand, if the comparison result proves that the date and start time of the program information are not future date and time relative to the current date and time (i.e., step S161: NO), the date and time judgment section 313 then compares the date and end time of the program information with the current date and current time as acquired from the current date/time acquisition section 314 (step S162). If the comparison result proves that the date and end time of the program information are future date and time relative to the current time (i.e., step S162: YES), since the program of the program information is currently on air, the date and time judgment section 313 sends the date, start time, end time and channel number of the program information to the program monitoring device 4 as monitoring information and instructs monitoring of the program (step S165).

On the other hand, if the comparison result in step S161 proves that the date and end time of the program information are not future date and time relative to the current time (i.e., step S161: NO), since the program of the program information is a recorded program that was broadcasted in the past, the date and time judgment section 313 sends the date, start time, end time and channel number of the program information to the program monitoring device 4 as the program playback information and instructs playback of the program (step S164).

As described hereinabove, the first embodiment according to the present invention extracts the program information containing in texts written in a natural language and displays the extracted program information on the screen. Without the need for distinguishing reservation, playback or monitoring, user's push-down of a single "reservation/playback" button instructs reservation, playback or monitoring the program. That is, the program relating to the program information displayed on the display screen is reserved for recording if it is a future program, played back if it is a stored past program, or monitored immediately if it is currently on air, thereby enabling the user to operate with the same interface regardless of reservation, playback or monitoring. Additionally, even if the date of the program information includes only month and day, it is possible to compliment year information from the current date, thereby providing flexibility to contents written in the texts.

Second Embodiment

Figure 8:
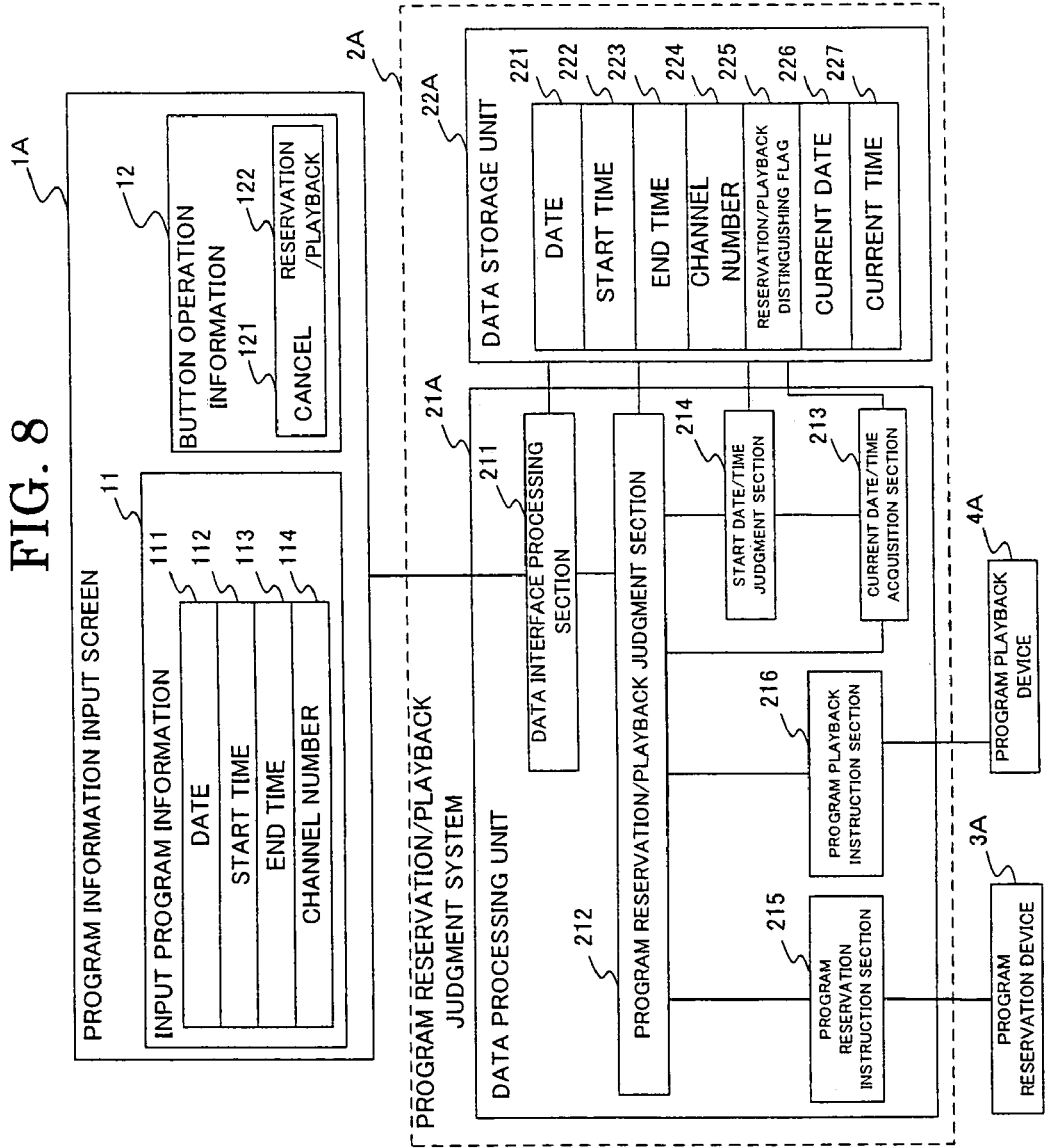
FIG. 8 is a block diagram to illustrate an exemplified system for reserving and playing back a program by the same interface as a second embodiment of the present invention.
Figure 9:
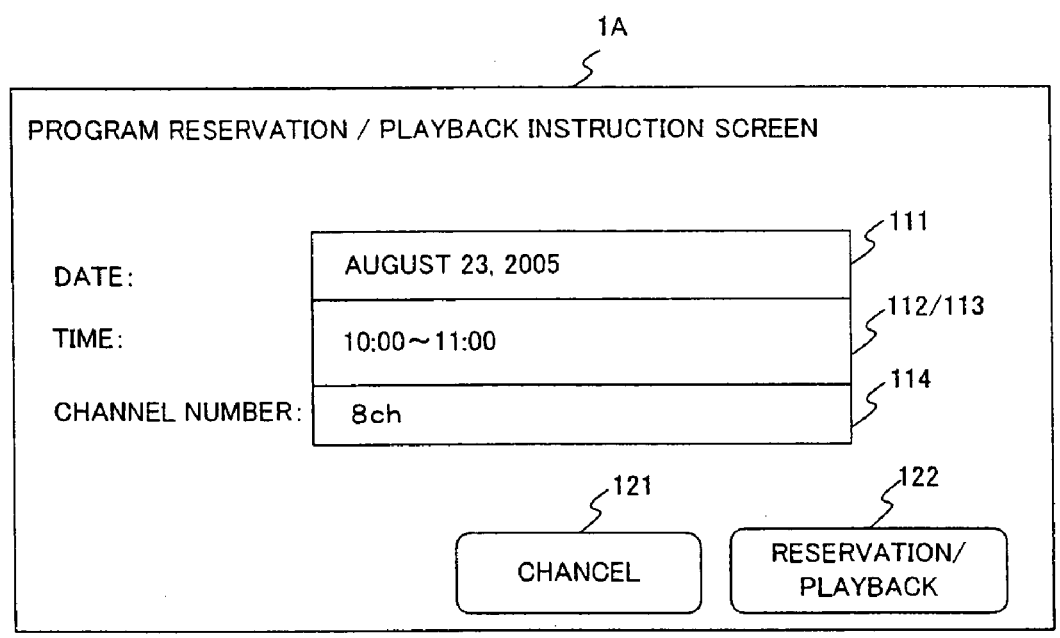
FIG. 9 is a screen configuration to show an exemplified program reservation/playback instruction screen for enabling the user to input reservation or playback instructions of a program.

Now, a second embodiment of the present invention will be described. FIG. 8 is a block diagram of an exemplified system to realize reservation and playback of a program by the same interface as the second embodiment of the present invention that is different from the first embodiment in the following respects. FIG. 9 is an exemplified screen configuration of the program reservation/playback instruction screen for enabling the user to input reservation or playback instructions of a program. The screen configuration is similar to that in FIG. 2 of the first embodiment. However, this embodiment differs from the first embodiment using the screen in FIG. 2 for confirming program information in texts written in a natural language. The screen in FIG. 9 is used by the user as input program information 11 in FIG. 8 for inputting program information relating to any program that the user likes to reserve or playback.

In this embodiment as shown in FIG. 9, the screen for enabling the user to instruct reservation and playback of a program is also the same screen (i.e., the same interface) so that the user is able to instruct the same and a single "reservation/playback" button after inputting the date, start time, end time and channel number of a program regardless of reservation or playback. At the time of pushing down the "reservation/playback" button, reservation or playback of the program is automatically distinguished by the program reservation/playback judgment section 212 as shown in FIG. 8 based on the date and time inputted by the user through the program reservation/playback instruction screen in FIG. 9 or the equivalent program information input screen in FIG. 8 and the current date and time.

Now, the system configuration in FIG. 8 will be described hereunder. The system in FIG. 8 comprises at least a program information input screen 1A, a program reservation/playback judgment system 2A, a program reservation device 3A and a program playback device 4A. The program reservation device 3A and the program playback device 4A are devices comprising a hard disc recorder, a DVD recorder or the like that are designed to reserve, store or playback a program that the user designates by its date, start time, end time and channel number.

The program information input screen 1A is a screen equivalent to the exemplified program reservation/playback instruction screen in FIG. 9 as displayed on a display screen and comprises input program information 11 that is items to be inputted and a button operation information 12 that is a displayed button to be operated. The input program information 11 is provided with items for inputting date 111, start time 112, end time 113 and channel number 114. The button operation information 12 comprises a cancel button 121 and a reservation/playback button 122. In other words, screens for instructing reservation and playback are the same input screen.

The program reservation/playback judgment system 2A comprises at least a data processing unit 21A that is activated on a program and a data storage unit 22A. The data storage unit 22A is a storage device such as a memory, a hard disc or the like that is accessible from the data processing unit 21A. The data processing unit 21A comprises at least a user interface processing section 211, a program reservation/playback judgment section 212, a current date/time acquisition section 213, a start date/time judgment section 214, a program reservation instruction section 215 and a program playback instruction section 216.

On the other hand, the data storage unit 22A holds at least date 221, start time 222, end time 223, channel number 224, reservation/playback distinguishing flag 225, current date 226 and current time 227 as information for reservation/playback. It is to be noted that date 221, start time 222, end time 223, channel number 224, reservation/playback distinguishing flag 225, current date 226 and current time 227 held in the data storage unit 22A are names for accessing the data held in the data storage unit 22A.

When the program reservation/playback judgment section 212 instructs the user interface processing section 211 to initiate processing, the user interface processing section 211 displays the program information input screen 1A for enabling the user to input program information and acquires input program information 11 that is inputted by the user. At this time, user's input is confirmed when the reservation/playback button 122 is pushed down and date 111, start time 112, end time 113 and channel number 114 inputted by the user are saved as the corresponding date 221, start time 222, end time 223 and channel number in the data storage unit 22A. On the other hand, if a cancel button 121 is pushed down, the input program information 11 whose part or all items have been inputted is cancelled.

The user interface processing section 211 may be constructed so as to input date, start time, end time and channel number in an input format different from FIG. 9 as long as the input format for the date, start time, end time and channel number for designating a program is unified for reservation, playback and the like. Alternatively, in certain cases, it may be realized by utilizing versatile program information such as EPG (Electronic Program Guide), internet or the like.

When the program reservation/playback judgment section 212 instructs the current date/time acquisition section 213 to initiate processing, the current date/time acquisition section 213 acquires the current date and outputs it to current date 226 in the data storage unit 22A. Moreover, current time is also acquired to be outputted to the current time 227 in the data storage unit 22A.

The program reservation/playback judgment section 212 sends to a start date/time judgment section 214 the date 221, start time 222 in the input program information 11 from the user the current date 226 and current time 227 acquired by the current date/time acquisition section 213. The start date/time judgment section 214 checks if the date 221 sent thereto includes year information. If not included, year information is complemented before being outputted to date 221.

Furthermore, the start date/time judgment section 214 compares date 221 and start time 222 with current date 226 and current time 227 for outputting a flag to indicate whether the program should be reserved or played back to the reservation/playback distinguishing flag 225 in the data storage unit 22A.

If the flag saved in the reservation/playback distinguishing flag 225 is the reservation flag, the program reservation/playback judgment section 212 sends to the program reservation instruction section 215 the date 221, start time 222, end time 223 and channel number 224. On the other hand, if the flag saved in the reservation/playback distinguishing flag 225 is the playback flag, the date 221, start time 222 and channel number 224 are sent to the program playback instruction section 216.

The program reservation instruction section 215 sends to the program reservation device 3A the date 221, start time 222, end time 223 and channel number 224 that are sent from the program reservation/playback judgment section 212 for reserving the program. On the other hand, the program playback instruction section 216 sends to the program playback device 4A the date 221, start time 222 and channel number 224 that are sent from the program reservation/playback judgment section 212 for playing back the stored program.

Figure 10:
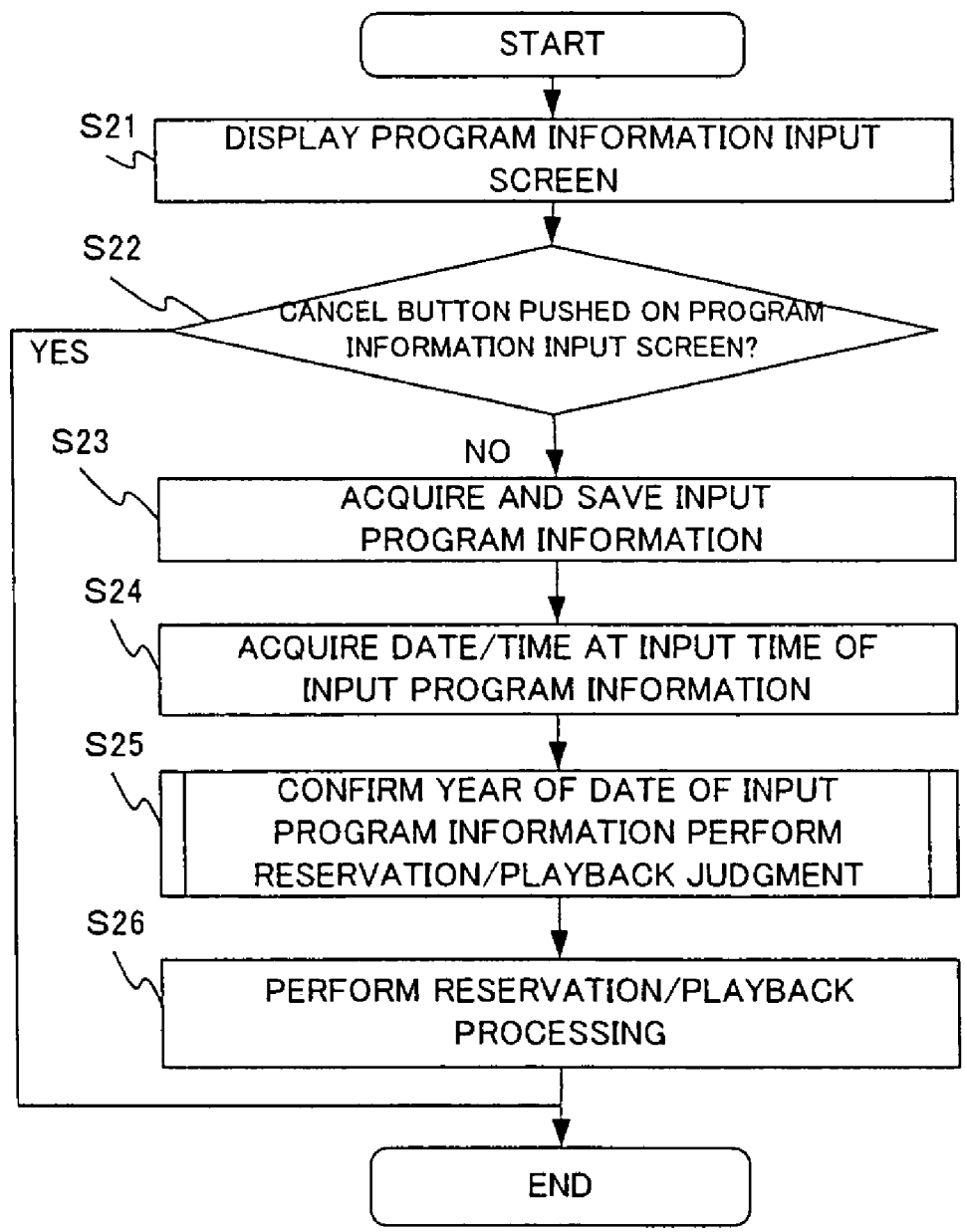
FIG. 10 is a flowchart for describing an exemplified operation in the second embodiment of the present invention.
Figure 11:
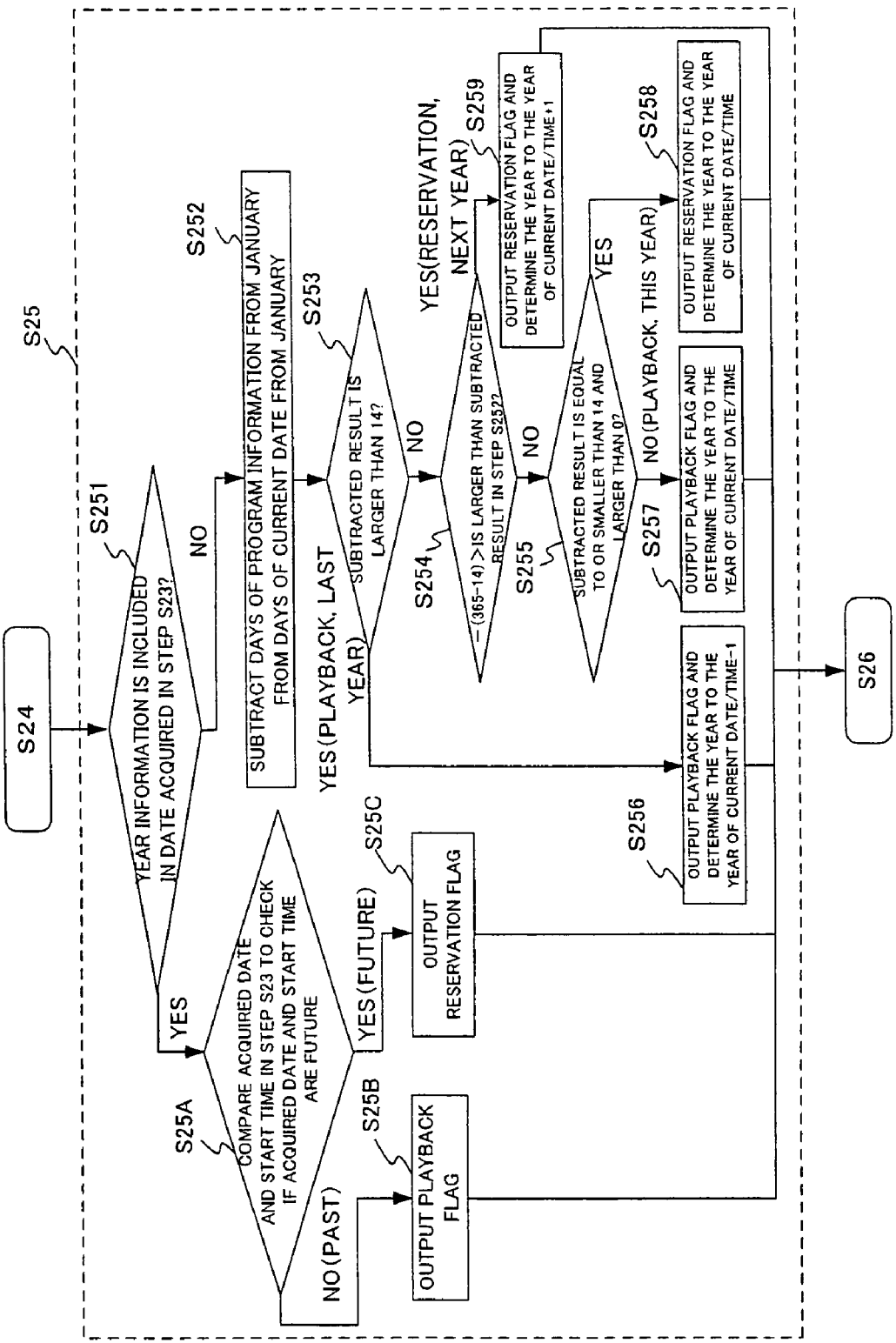
FIG. 11 is a flowchart for detailed description of step S25 in FIG. 10.
Figure 12:
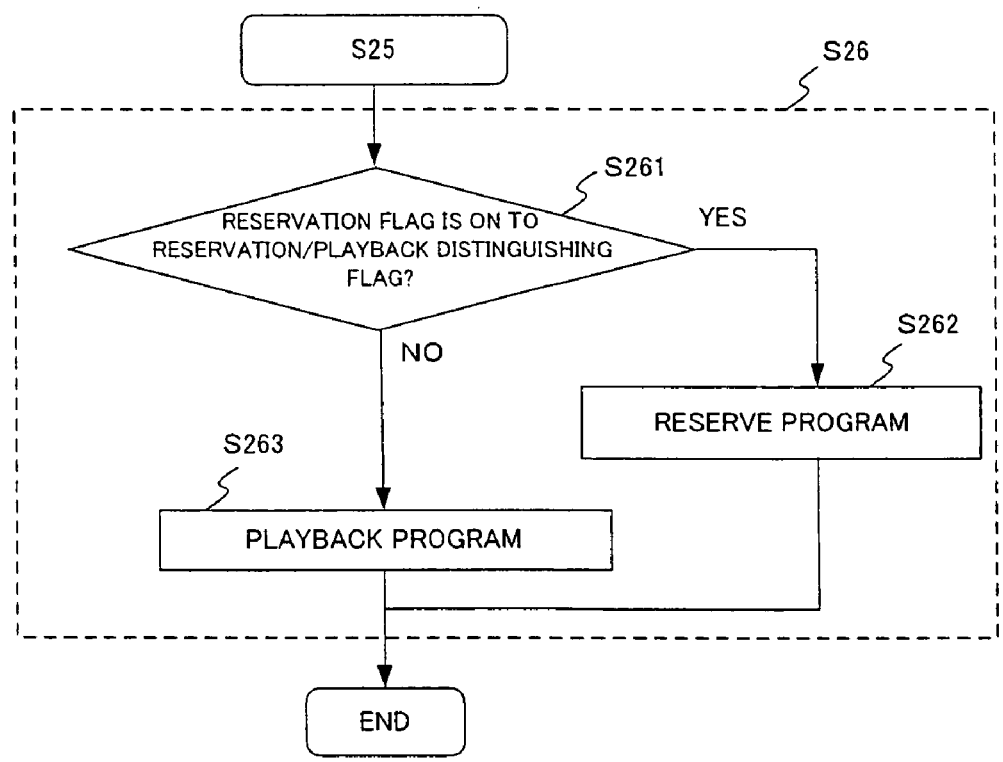
FIG. 12 is a flowchart for detailed description of step S26 in FIG. 10.

Now, the overall operation of the second embodiment will be described in detail using the flowcharts in FIGS. 10, 11 and 12 as well as with reference to the system configuration in FIG. 8 and the screen display in FIG. 9. FIG. 10 is a flowchart for describing an exemplified operation of the second embodiment according to the present invention. FIG. 11 is a flowchart to describe in detail the operation of step S25 in FIG. 10. FIG. 12 is a flowchart to describe in detail the operation of step S26 in FIG. 10.

Firstly, in the flowchart in FIG. 10, the program reservation/playback judgment section 212 instructs the user interface processing section 211 to display the program information input screen 1A. Then, the user interface processing section 211 displays the program information input screen 1A. As described hereinabove, the program information input screen 1A is a screen equivalent to the program reservation/playback instruction screen such as in FIG. 9. It is a screen for enabling the user to input the input program information 11 and instruct the program reservation/playback judgment system 2A to initiate or cancel the processing by operating the button for the button operation information 12. The user inputs the date 111, start time 112, end time 113, and channel number 114 in the all input items on the displayed program information input screen 1A and pushes down ether the reservation/play back button 122 for initiating the processing or the cancel button 121 for canceling the processing (step S21).

As described hereinabove, the program reservation/playback instruction screen in FIG. 9 is a screen similar to the program information input screen in FIG. 8 for inputting the date, start time, end time and channel number designated by the user, in which both star time and end time are integrated into a single "time" input frame in this particular example. Again, as described hereinabove, any desired format may be used in a real system as long as the reservation and playback screens are unified and, in certain cases, the input format may be any one so as to uniformly set by utilizing program information written in a natural language such as texts, or any versatile program information such as EPG, internet program list or the like.

The user interface processing section 211 checks whether the user pushes down the button operation information 122 or the cancel button 121 (step S22). The processing ends if the cancel button 121 is pushed down (i.e., step S22: YES), while the processing continues if the reservation/playback button 122 is pushed down (i.e., step S22: NO).

Upon pushing down the reservation/playback button 122, the user interface processing section 211 acquires the input program information 11 inputted by the user and the acquired input program information 11 are saved in the date 221, start time 222, end time 223 and channel number 224 in the corresponding data storage unit 22A (step S23). On the other hand, if the program reservation/playback judgment section 212 instructs to perform acquisition processing of the current date and time from the current date/time acquisition section 213, the current date/time acquisition section 213 acquires the current date and outputs the current date 226 of the corresponding data storage unit 22A and also acquires the current time 227 of the corresponding data storage unit 22A to output the current time 227 of the corresponding data storage unit 22A (step S24).

When the program reservation/playback judgment section 212 sends to the start date/time judgment section 214 the date 221, start time 222, current date 226 and current time 227 saved in the data storage unit 22A, the start date/time judgment section 214 checks whether the program should be played back or reserved based on the start date and time sent thereto and the current date and time (step S25). The detailed operation of step S25 in which the start date/time judgment section 214 checks whether the program should be reserved or played back will be described hereinafter with reference to FIG. 11.

In FIG. 11, the start date/time judgment section 214 checks if year information is included in the date 221 that is sent thereto from the program reservation/playback judgment section 212 (step S251). If year information is included in the date 221 (i.e., step S251: YES), the date 221 and start time 222 are compared with the current date 226 and current time 227 (step S25A). If the comparison result proves that the date 221 and start time 222 are older than the current date 226 and current time 227, thereby proving that the date 221 and start time 222 are information in the past (i.e., step S25A: NO), the playback flag is outputted to the reservation/playback distinguishing flag 225 of the data storage unit 22A in order to instruct playback of the program that was recorded past program (step S25B).

On the other hand, if the comparison result in step S25A proves that the date 221 and start time 222 are new relative to the current time 227, thereby proving that the date 221 and the start time 222 are information indicating future (i.e., step S25A: YES), the reservation flag is outputted to the reservation/playback distinguishing flag 225 of the data storage unit 22A in order to indicate reservation of future program (step S25C).

If year information is not included in the date 221 in step S251 (i.e., step S251: NO), the start date/time judgment section 214 compares the dates of the date 221 and the current date 226 each from January 1 by subtracting the days of the date 221 from January 1 from the days of the current date 226 from January 1 (step S252) and checks if the subtracted result is larger than 14 days (step S253). It is to be noted here that the "14 days" or the reference days is equivalent to the reservation target term as described herein above on the first embodiment. It was temporarily set on the assumption that the program information for 14 days are provided as the days representing the reservation target term. However, such number may be increased or decreased depending on the days of the program information included in an available program list.

If the subtracted result proves to be larger than 14 days (i.e., step S253: YES), it is larger than the reservation target term and the start date and time judgment section 214 decides that the date 221 having no year information is for the program information to playback the program recorded in the past relative to the year of the current date 226. As a result, the playback flag is outputted to the reservation/playback distinguishing flag 225 in the data storage unit 22A. The year information is complemented by subtracting "1" from the year of the date 221 having no year information and the complemented date is outputted in order to overwrite the date 221 in the data storage unit 22A (step S256).

On the other hand, if the subtracted result in step S252 is not larger than 14 days (i.e., step S253: NO), then the start date and time judgment section 214 checks if the subtracted result in step S252 is smaller than "−(365−14)" days (step S254). If the subtracted result in step S252 is smaller than "−(365−14)" days (i.e., step S254: YES), the start date/time judgment section 214 decides the date 221 having no year information to be program reservation for the next year. As a result, the reservation flag is outputted to the reservation/playback distinguishing flag 225 in the data storage unit 22A and the date 221 having no year information is complemented by adding the year with the year of the current date 226 plus "1" and the complemented date having such year information is outputted to overwrite the date 221 in the data storage unit 22A (step S259).

On the other hand, if the subtracted result in step S252 is not smaller than "−(365−14)" days (i.e., step S254: NO), the start date and time judgment section 214 further checks if the subtracted result in step S252 is equal to or smaller than 14 days of the reservation target term and also larger than 0 (step S255). If the subtracted result in step 252 is equal to or smaller than the 14 days of the reservation target term and also larger than 0 (i.e., step S255: YES), the start date and time judgment section 214 decides to be reservation of a program in the year of the current date 226. Then, the reservation flag is outputted to the reservation/playback distinguishing flag 225 in the data storage unit 22A and also year information of the date 221 is complemented with the year of the current date 226. The complemented date with the year information is outputted to the data storage unit 22A for overwriting the date 221 (step S258).

If the subtracted result in step S252 is equal to or smaller than 14 days of the reservation target term but not larger than 0 (i.e., step S255: NO), the start date/time judgment section 214 outputs the playback flag to the reservation/playback distinguishing flag 225 in the data storage unit 22A for playing back a program that was recorded in the past year relative to the year of the current date 226. Also, the date 221 having no year information is complemented with the year information of the current date 226 minus "1" and the complemented date is outputted for overwriting the date 221 in the data storage unit 22A (step S257).

It is to be noted that, if the date 221 does not include year information but week information is included, the start date/time judgment section 214 may be able to determine the year by checking a calendar as the year decision processing.

Now, upon completing the judgment processing of reserving or playing back a program by the start date/time judgment section 214 that sets the playback flag or the reservation flag as the reservation/playback distinguishing flag 225 in the data storage unit 22A, the processing returns to step S26 in FIG. 10. The program reservation/playback judgment section 212 carries out the reservation or playback processing of the program depending on the result of judgment processing of the start date/time judgment section 214 (step S26). The detailed operation in step S26 in which the program reservation/playback judgment section 212 performs either reservation or playback processing of a program will be described hereinafter with reference to FIG. 12.

In FIG. 12, the program reservation/playback judgment section 212 first checks if the reservation flag is outputted to the reservation/playback distinguishing flag 225 in the data storage unit 22A (step S261). If the reservation flag is outputted to the reservation/playback distinguishing flag 225 (i.e., step S261: YES), the program reservation/playback judgment section 212 sends to the program reservation instruction section 215 the date 221, start time 222, end time 223 and channel number 224 in the data storage unit 22A. Then, the program reservation instruction section 215 sends to the program reservation device 3A the date 221, start time 222, end time 223 and channel number 224 that are sent from the program reservation/playback judgment section 212 for reserving the program (step S262).

On the other hand, if the reservation flag is not outputted to the reservation/playback distinguishing flag 225 (i.e., step S261: NO), the program reservation/playback judgment section 212 assumes that the playback flag is outputted and outputs to the program playback instruction section 216 the date 221, start time 222 and channel number 224 in the data storage unit 22A. Then, the program playback instruction section 216 sends to the program playback device 4A the date 221, start time 222 and channel number 224 that are sent from the program reservation/playback judgment section 212 and plays back the stored program (step S263).

It is to be noted that, if the program playback device 4A has a television display function like the program monitoring device 4 in the first embodiment, the playback flag is outputted to the reservation/playback distinguishing flag 225 in the data storage unit 22A and, if the current time 227 is between the start time 222 and the end time 223, the program designated by the input program information 11 is presently on air and such program may be directly monitored instead of playback operation of the stored program.

As described hereinabove, in the second embodiment of the present invention, the single "reservation/playback" button 122 can be used for making judgment whether the program designated by the input program information 11 is reserved or the stored program is played back by using the date 111 and the start time 112 that are inputted as the input program information 11, thereby enabling to perform the input operation using the same interface regardless of program reservation or playback. Additionally, even if only month and date are included as the date 111 of the input program information 11, year information can be complemented from the current date, thereby enabling to performing the processing to distinguish reservation and playback and thus improving user's input flexibility.

INDUSTRIAL APPLICABILITY

The present invention can be applied to various applications such as a program reservation device for reserving and storing any program using its date, start time, end time and channel number, a computer program for performing a program reservation/playback judgment method for reserving or playing back such program, and a recording medium for such program. It can also be applied to applications such as a program playback device for playing back any stored program using its date, start time, end time and channel number, a program for enabling a computer to perform a program reservation/playback judgment method for playing back such program, and a recording medium for such computer program.

Although preferred embodiments of the present invention have been described hereinabove, it is to be noted that such embodiments are only examples of the present invention and a person having an ordinary skill in the art is able to make various modifications without departing from the scope and spirit of the present invention depending on particular applications.

What is claimed is:

1. A program reservation and playback judgment system including natural language program information processing means for reading texts written in a natural language and including program information comprising at least date, start time, end time and channel number of any program that the user likes to reserve for recording or playback, for extracting the program information included in the texts and for reserving for recording or playing back the program based on the extracted program information, comprising:
    current date and time acquisition means for acquiring the current date and time; and
    date and time judgment means for making a judgment whether the program of the program information is reserved for recording or played back based on the current date and time acquired by the current date and time acquisition means and the program information.

2. The program reservation and playback judgment system in claim 1, wherein the program information extracted from the texts is displayed on a display device as a confirmation screen for enabling the user to operate a confirmation button before the date and time judgment means makes a judgment operation whether the program of the program information is reserved for recording or played back.

3. The program reservation and playback judgment system of claim 2, wherein the program information extracted from the texts is displayed on the display device as a confirmation screen for enabling the user to edit the displayed contents of the program information on the confirmation screen.

4. The program reservation and playback judgment system of claim 3, wherein the date and time judgment means compares the date and start time of the program information with the current date and time for instructing reservation for recording the program of the program information if the date and start time of the program information are future date and time relative to the current date and time, while instructing playback of the program of the program information if the date and start time of the program information are past date and time relative to the current date and time.

5. The program reservation and playback judgment system of claim 2, wherein a program information input screen for inputting the program information of any program that the user likes to reserve for recording or playback and comprising at least date, start time, end time and channel number is used as the confirmation screen for displaying on the screen of the display device the program information extracted from the texts.

6. The program reservation and playback judgment system of claim 2, wherein the date and time judgment means compares the date and start time of the program information with the current date and time for instructing reservation for recording the program of the program information if the date and start time of the program information are future date and time relative to the current date and time, while instructing playback of the program of the program information if the date and start time of the program information are past date and time relative to the current date and time.

7. The program reservation and playback judgment system of claim 1, wherein the date and time judgment means compares the date and start time of the program information with the current date and time for instructing reservation for recording the program of the program information if the date and start time of the program information are future date and time relative to the current date and time, while instructing playback of the program of the program information if the date and start time of the program information are past date and time relative to the current date and time.

8. The program reservation and playback judgment system of claim 7, wherein the date and time judgment means instructs monitoring of the program of the program information if the date and start time of the program information are past date and time relative to the current date and time and also the end time of the program information is future time relative to the current time.

9. The program reservation and playback judgment system of claim 1, further comprising year complementing means for complementing year information of the date of the program information with reference to the current date and time acquired by the date and time acquisition means if the date of the program information extracted from the texts excludes year information and includes only month and day.

10. The program reservation and playback judgment system of claim 1, wherein the texts are either text files of Web pages, electronic mails or electronic libraries, or OCR readout of newspaper or magazine articles, or alternatively program related texts prepared by the user.

11. A program reservation and playback judgment method having a natural language program information processing step for reading texts written in a natural language and including program information comprising at least date, start time, end time and channel number of any program that the user likes to reserve for recording or playback, analyzing the texts and extracting the program information contained in the texts for reserving or playing back the program based on the extracted program information, comprising:
    a current date and time acquisition step for acquiring the current date and time; and
    a date and time judgment step for making a reservation or playback judgment whether the program of the program information is reserved for recording or played back based on the current date and time acquired in the current date and time acquisition step and the program information,
    wherein the program reservation and playback judgment steps are performed on a program reservation and playback judgment hardware system.

12. The program reservation and playback judgment method of claim 11, wherein the program information extracted from the texts are displayed on the screen of a display device as a confirmation screen, and the reservation or playback judgment operation for making a judgment whether the program of the program information is reserved for recording or played back in the date and time judgment step is performed upon user's confirmation by pushing an operation button.

13. The program reservation and playback judgment method of claim 12, wherein a program information input screen for enabling the user to input the program information comprising at least date, start time, end time and channel number of any program that the user likes to reserve for recording or playback is used as the confirmation screen instead of displaying the program information extracted from the texts on a display device.

14. The program reservation and playback judgment method of claim 12, wherein the program information extracted from the texts are displayed on the display device as the confirmation screen for enabling the user to edit the contents of the displayed program information on the confirmation screen.

15. A non-transitory computer-readable medium encoded with a computer program, which program when executed by the computer causing the computer to execute the program reservation and playback judgment method of claim 11.

16. A program recording medium for recording the program reservation and playback judgment program of claim 15 in a computer readable recording medium.

17. The program reservation and playback judgment method of claim 11, wherein the date and time judgment step compares the date and start time of the program information with the current date and time for instructing reservation for recording the program of the program information if the date and start time of the program information are future date and time relative to the current date and time, while instructing playback the program of the program information if the date and time of the program information are past date and time relative to the current date and time.

18. The program reservation and playback judgment method of claim 17, wherein the date and time judgment step instructs monitoring the program of the program information if the date and start time of the program information are past date and time relative to the current date and time and also the end time of the program information is future time relative to the current date and time.

19. The program reservation and playback judgment method of claim 11, further comprising a year complementing step for complementing year information of the date of the program information with reference to the current date and time acquired in the current date and time acquisition step if the date of the program information extracted the texts includes only month and day and excludes year information.

20. The program reservation and playback judgment method of claim 11, wherein the texts are text files of Web pages, electronic mails, electronic libraries or OCR read-out of articles in magazines or newspapers, or program related texts prepared by the user.

* * * * *

UNITED STATES PATENT AND TRADEMARK OFFICE
CERTIFICATE OF CORRECTION

PATENT NO. : 7,974,834 B2  Page 1 of 1
APPLICATION NO. : 11/713596
DATED : July 5, 2011
INVENTOR(S) : Kiyotaka Konno et al.

It is certified that error appears in the above-identified patent and that said Letters Patent is hereby corrected as shown below:

On the cover sheet, left column:

"(30)   Foreign Application Priority Data
         Mar. 3, 2006    (JP)..........................................2006-0579054"

should read:

--(30)   Foreign Application Priority Data
         Mar. 3, 2006    (JP)..........................................2006-057904--

Signed and Sealed this
Twenty-sixth Day of June, 2012

David J. Kappos
*Director of the United States Patent and Trademark Office*